United States Patent [19]

Suda et al.

[11] Patent Number: 4,709,138

[45] Date of Patent: Nov. 24, 1987

[54] APPARATUS FOR DETECTING SHAKE OF IMAGE OF OBJECT

[75] Inventors: Yasuo Suda; Akira Akashi; Akira Hiramatsu, all of Yokohama, Japan

[73] Assignee: Canon Kabushiki Kaisha, Tokyo, Japan

[21] Appl. No.: 883,436

[22] Filed: Jul. 14, 1986

Related U.S. Application Data

[63] Continuation of Ser. No. 697,938, Feb. 4, 1985, abandoned.

[30] Foreign Application Priority Data

Feb. 9, 1984 [JP] Japan .................. 59-22419
Feb. 9, 1984 [JP] Japan .................. 59-22420

[51] Int. Cl.$^4$ .......................... G03B 3/10; G01J 1/20
[52] U.S. Cl. ................... 250/201; 250/204; 354/408
[58] Field of Search ............. 250/201 R, 201 PF, 204, 250/209, 578; 354/402, 408, 406, 407, 409

[56] References Cited

U.S. PATENT DOCUMENTS

| | | | |
|---|---|---|---|
| 4,218,119 | 8/1980 | Schickedanz | 250/201 |
| 4,503,325 | 3/1985 | Araki | 250/209 |
| 4,527,053 | 7/1985 | Kinoshita et al. | 250/201 PF |

*Primary Examiner*—Edward P. Westin
*Attorney, Agent, or Firm*—Fitzpatrick, Cella, Harper & Scinto

[57] ABSTRACT

An apparatus for detecting the shake of an image of an object, having first and second photosensor arrays for detecting an image of an object in two different directions, a signal processor for processing output signals from the first and second photosensor arrays and for producing a focusing control signal of an objective lens, a memory circuit for storing an output signal from the first photosensor array, and a discrimination circuit for discriminating the shake of the object in accordance with the signal stored in the memory circuit and a signal from the first photosensor array produced subsequent to this signal.

14 Claims, 19 Drawing Figures

FIG. 11 ated from each other over time;

APPARATUS FOR DETECTING SHAKE OF IMAGE OF OBJECT

This application is a continuation of application Ser. No. 697,938 filed Feb. 4, 1985, now abandoned.

BACKGROUND OF THE INVENTION

The present invention relates to a camera shake detection apparatus for performing shake detection using an optical/processing system of a focusing detection device.

Focus detection of a phototaking lens of a camera is conventionally performed by various methods. Such methods comprise a method for detecting an out-of-focus state of an object image at a position conjugate to the film plane, or a method for detecting the phase difference between two images formed by light beams from two different regions of a phototaking lens.

U.S. Pat. No. 4,218,119 describes an apparatus for detecting shake of an image due to movement of the object or handshaking utilizing a photodetector which is primarily used for focus detection. However, this apparatus adopts a focusing method for focusing in accordance with the degree of the out-of-focus state of an image. For this reason, it takes a relatively long period of time to stabilize the object lens at a prescribed position. In addition, shake detection can only be performed after proper focusing is established. Thus, it takes a relatively long period of time before a shutter is actuated after shake detection is performed.

SUMMARY OF THE INVENTION

It is a first object of the present invention to perform accurate shake detection using the photodetector of a focus detection apparatus.

It is a second object of the present invention to perform shake detection at high speed.

It is a third object of the present invention to stably perform focus detection and to detect shake of an image even if an image of an object detected by the photodetector of a focus detection apparatus is in an extremely out of focus state.

It is a fourth object of the present invention to allow use of the same signal processing algorithm for focus as that for shake detection, thereby reducing cost.

It is a fifth object of the present invention to automatically set photographing conditions which are not subject to any shake when a shake is detected. This is achieved by shifting a program diagram of a program shutter to a high speed shutter position.

It is a sixth object of the present invention to facilitate the start of shake detection procedures with an AF lock which is used by the operator to lock an automatic focus mechanism as needed.

The above and other objects, features and advantages of the present invention will be apparent from the following description taken in conjunction with the accompanying drawings.

DETAILED DESCRIPTION OF THE PREFERRED EMBODIMENT

Figure 1A:
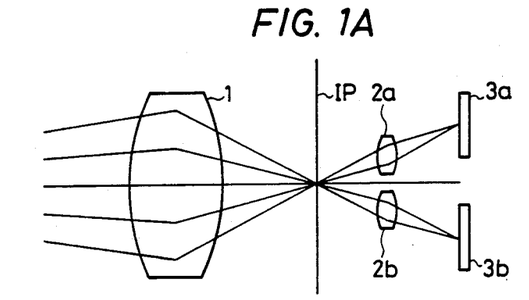
FIG. 1A is an optical schematic view of a focus detection apparatus according to the present invention, which is in an in-focus state.
Figure 1B:
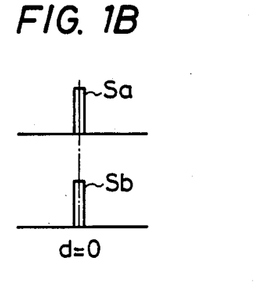
FIG. 1B shows an output signal in this state.
Figure 2A:
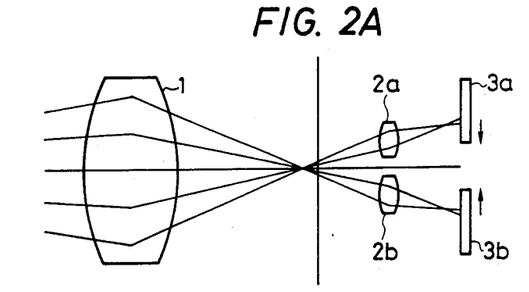
FIG. 2A is an optical sectional view of the focus detection apparatus in a near-in-focus state.
Figure 2B:
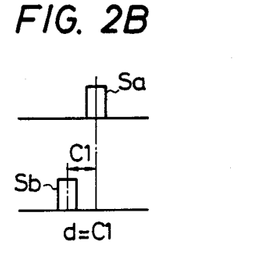
FIG. 2B shows an output signal in this state.
Figure 3A:
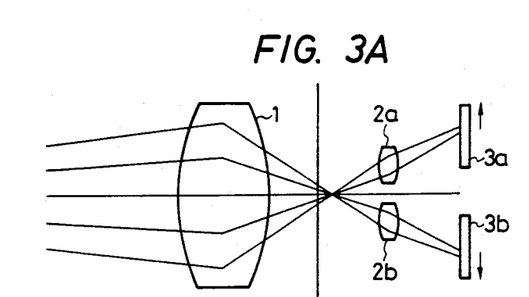
FIG. 3A is an optical schematic view of the focus detection apparatus in a far-in-focus state.
Figure 3B:
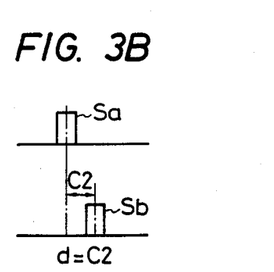
FIG. 3B shows an output signal in this state.

FIGS. 1 to 3 show the principle of focus detection utilizing phase differences. FIG. 1 shows the in-focus state, FIG. 2 shows the near-in-focus state and FIG. 3 shows the far-in-focus state. As seen in FIGS. 1A to 3A, optical images of light beams passing through two different regions of a photo-taking lens 1 are detected by two sensor arrays 3a and 3b through secondary image forming lenses 2a and 2b. The sensor arrays 3a and 3b produce output signals Sa and Sb, as shown in FIGS. 1B to 3B. In the in-focus state shown in FIG. 1, two images are formed at substantially corresponding positons on the sensor arrays 3a and 3b and the two output signals Sa and Sb have a substantially zero phase difference d. However, in the near-in-focus state and the far-in-focus state in FIGS. 2 and 3, the two images are shifted in position and the output signals Sa and Sb respectively have phase differences d=c1 and d=c2, as shown in FIGS. 2B and 3B. Therefore, when the phase difference d of the two output signals Sa and Sb is detected, the focusing state of the photographic lens 1 can be detected.

The phase difference d can be calculated by, for example, the following algorithm. Assume that the two photoelectric conversion outputs Sa and Sb are N image signals of imgae A{a(1), a(2), ..., a(n)} and image B{b (1), b(2), ..., b(n) }, and a correlation Pk between the two images A and B is given by:

$$Pk = \sum_{i=1}^{n} |b(i + |k|) - a(i)| \quad (k < 0) \quad (1)$$

$$= \sum_{i=1}^{n} |b(i) - a(i + k)| \quad (k \geq 0) \quad (1)'$$

(where $n = N - |k|$ and $-N/2 \leq k \leq N/2$)

According to equations (1) and (1)' above, the correlation Pk is calculated by checking the coincidence between the images A and B while changing the phase difference. The value of k whick provides a minimum value of the correlation Pk corresponds to the phase difference d. Therefore, when the phase difference d is calculated in accordance with the equations (1) and (1)', the focus state of the photographic lens 1 can be determined.

Figure 4A:
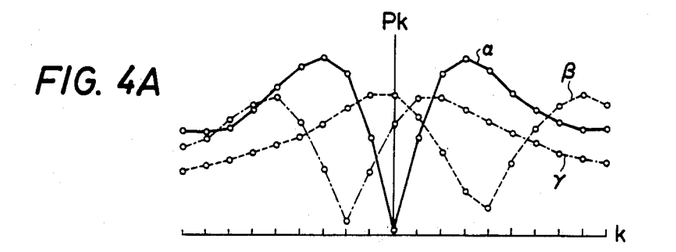
FIGS. 4A to 4D are graphs showing the relationship between the output signals of two sensor arrays.
Figure 4B:
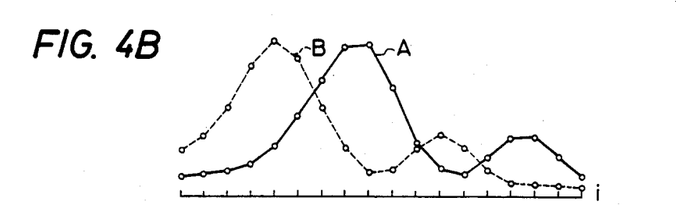
Figure 4C:
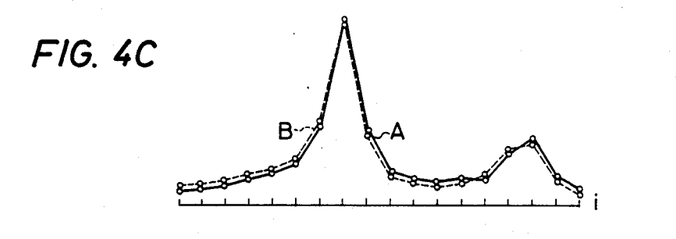
Figure 4D:
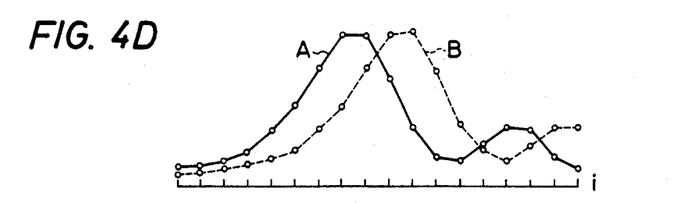
Figure 5A:
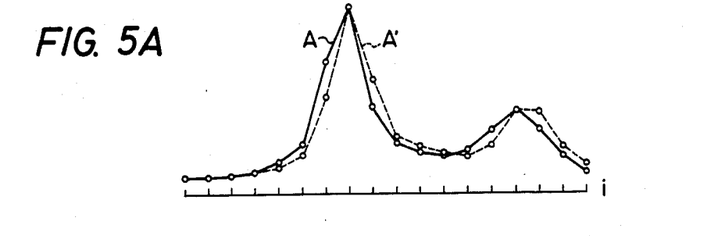
FIGS. 5A to 5C are graphs showing the output signals of the sensor arrays, wherein the signal are separated from each other over time.
Figure 5B:
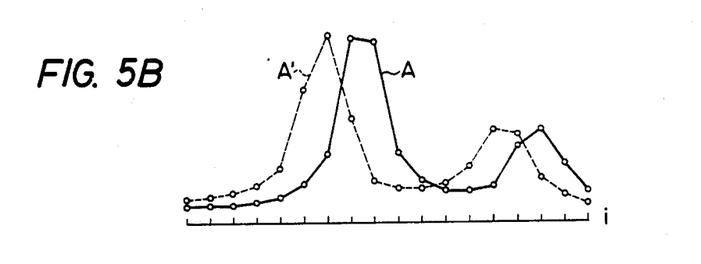
Figure 5C:
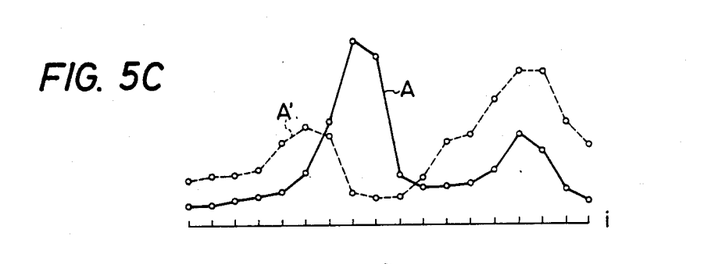

FIGS. 4A to 4D show the images A and B and the corresponding correlations Pk. FIG. 4C shows an image signal in the in-focus state, and the correlation Pk in this state is represented by curve α in FIG. 4A. The correlation Pk in the out-of-focus state in FIG. 4B is represented by curve β in FIG. 4A. The correlation Pk in the out-of-focus state in FIG. 4D is represented by curve γ in FIG. 4A. According to the focus detection method utilizing phase differences, the phase difference between the two images formed by light beams emerging from two different regions of the photographic lens 1 is determinable. FIG. 5 shows images A (A, A') which are shifted over time. When there is no shake, substantially the same output signals are obtained as shown in FIG. 5A. However, when shake is present, the object pattern formed on the sensor changes due to such shake, and the output waveforms from the sensor arrays become different from each other as shown in FIGS. 5B and 5C.

Figure 6:
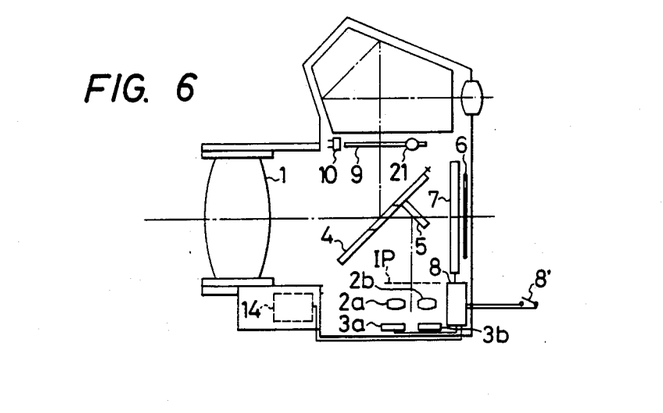
FIG. 6 is a sectional view of a single-lens-reflex camera having a focus detection apparatus assembled therein.

FIG. 6 shows a single-lens-reflex camera in which the apparatus shown in FIGS. 1 to 3 is assembled. In FIG. 6, the photographic lens 1, the lenses 2a and 2b, and the sensor arrays 3a and 3b are the same as those shown in FIGS. 1 to 3. Referring to FIG. 6, the camera further has a quick return mirror 4 having a submirror 5, a photographic film 6, a shutter 7, a program shutter control unit 8, a shutter release switch 8', a beam splitter 9, an exposure meter 10, an automatic focus motor 14 to be described later, and a handshaking warning LED 21 to be described later. IP is the primary imaging plane.

The present invention will be described in more detail with reference to the block diagram shown in FIG. 7.

Figure 7:
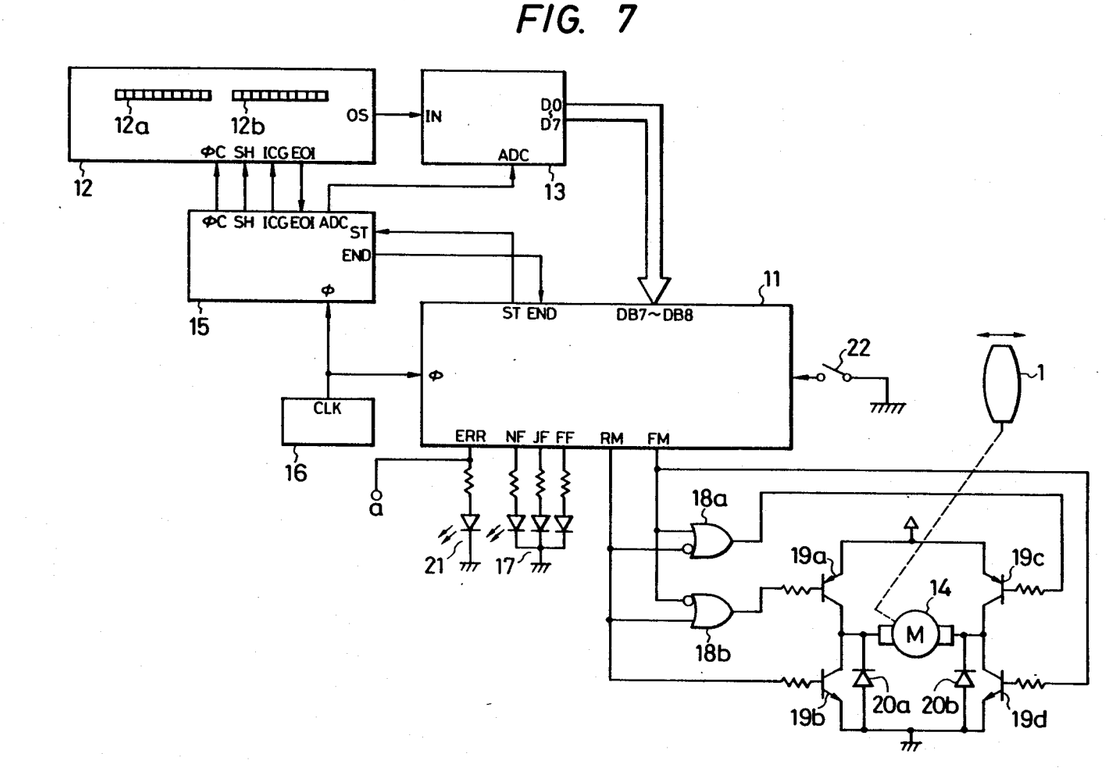
FIG. 7 is a block diagram according to an embodiment of the present invention.

Referring to FIG. 7, the image signal processor 11 is a 1-chip microprocessor which has a CPU (central processing unit), a memory circuit, I/O ports and the like. The processor 11 receives signals from a sensor device 12 consisting of sensor arrays 12a and 12b and CCDs (charge-coupled devices) through an A/D converter 13. A control output from the processor 11 controls the motor 14. The sensor device 12 is driven by a CCD driver 15. The CCD driver 15 and the processor 11 receive clock pulse signals from a clock generator 16.

Two images are formed on the sensor arrays 12a and 12b by light beams which have passed through two different regions of the photographic lens. Accumulation and transfer of optical images is performed by control signals φC, SH and ICG from the CCD driver 15. When the processor 11 supplies a start signal ST to the driver 15, the driver 15 sends an accumulation start signal ICG to the sensor device 12 together with the clock φC generated in response to a signal CLK from the clock generator 16. In response to the signal ICG, the sensor device 12 starts accumulating the two images. When the photocharges of these images reach a predetermined accumulation level, the sensor device 12 sends an accumulation end signal EOI to the driver 15. The driver 15 then sends a photoelectric conversion output transfer signal SH to the sensor device 12. The charges accumulated in the sensor device 12 are transferred to the CCDs and an end signal END is supplied to the processor 11. In synchronism with the clock φC from the driver 15, the sensor device 12 time-serially supplies analog photoelectric conversion signals OS of the two images to the A/D converter 13. The A/D converter 13 performs 8-bit A/D conversion in synchronism with a conversion command signal ADC from the driver 15 and supplies digital time-serial signals D0 to D7 to the processor 11. The processor 11 stores the input two image signals A{a(1), a(2), ..., a(n)} and Bb(1), b(2), ..., b(n) } and detects the phase difference d between the two images A and B for automatic focus in accordance with the following procedures.

$$A(i) = a(i) \qquad (I)$$
$$B(i) = b(i)$$
(where $i = 1, 2, \ldots, N$)

$$Pk = \sum_{i=1}^{n} |B(i + |k|) - A(i)| \quad (k < 0) \qquad (II)$$

$$= \sum_{i=1}^{n} |B(i) - A(i + k)| \quad (k \geq 0)$$

where $n = N - |k|$, and $-N/2 \leq k \leq N/2$
$$d = k|\min(Pk)| \quad (-N/2 \leq k \leq N/2) \qquad (III)$$

Note that (III) above means that "the value of k which provides a minimum value of Pk is defined as d". The phase difference d is compared with a predetermined automatic focus allowable value e1 (positive value). If $|d| \leq e1$, it is determined that an in-focus state is obtained. Then, a signal of high level (to be referred to as H hereinafter) is supplied to a display terminal JF, and a signal of low level (to be referred to as L hereinafter) is supplied to display terminals NF and FF. An LED 17 connected to the terminal JF is thus turned on. However, if $d < -e1$, it is determined that the lens is in the near-in-focus state. A signal H is supplied to only the terminal NF If $d > e1$, it is determined that the lens is in the far-in-focus state, and a signal H is supplied to only the terminal FF.

When shake detection is performed, in a processing sequence beginning with the sensor image accumulation, the phase difference d between the images A and B is calculated using the signal A' of the image A in the immediately preceding sequence as the signal of the image B. With this method, the phase difference between the same images which are shifted only over time can be detected. If handshaking has occurred, the phase difference d has a value substantially corresponding to the amount of handshaking although the same image is involved.

In this manner, the phase difference d is compared with a predetermined handshaking allowable value e2 (positive value). If $|d| \leq e2$, it is determined that no handshaking has occurred. This operation sequence can be written as:

(I')A(i)=a(i)

B(i)=A'(i)

(where i=1, 2, ..., N)
Note that A'(i) is the A image signal of the immediately preceding sequence, and (II) and (III) are the same as in the focus processing.

Output terminals RN and FM of the processor 11 are for driving the motor 14 mounted on the photographic lens. When both the terminals RN and FM are H, transistors 19a and 19c are OFF and transistors 19b and 19d are ON through gates 18a and 18b. Thus, the transistors 19b and 19d and diodes 20a and 20b apply an electrical brake on the motor 14. When the terminal RM is H and the terminal FM is L, the transistors 19a and 19d are OFF while the transistors 19b and 19c are ON. The motor 14 is biased in the direction from right to left in the figure. When the terminal RM is L and the terminal FM is H, the transistors 19b and 19c are OFF and the transistors 19a and 19d are ON. The motor 14 is biased in the direction from left to right and driven in the direction opposite to that when the terminal RM is H and the terminal FM is L. When both the terminals RM and FM are L, all the transistors 19a through 19d are OFF and the motor 14 is electrically released.

When shake is detected, a terminal ERR of the processor 11 goes H and turns on the LED 21. A switch 22 is an AF lock switch. If the switch 22 is ON when the operator wishes to stop the automatic focus function, the processor 11 sets the terminals RM and FM to H and stops the motor 14.

Figure 8:
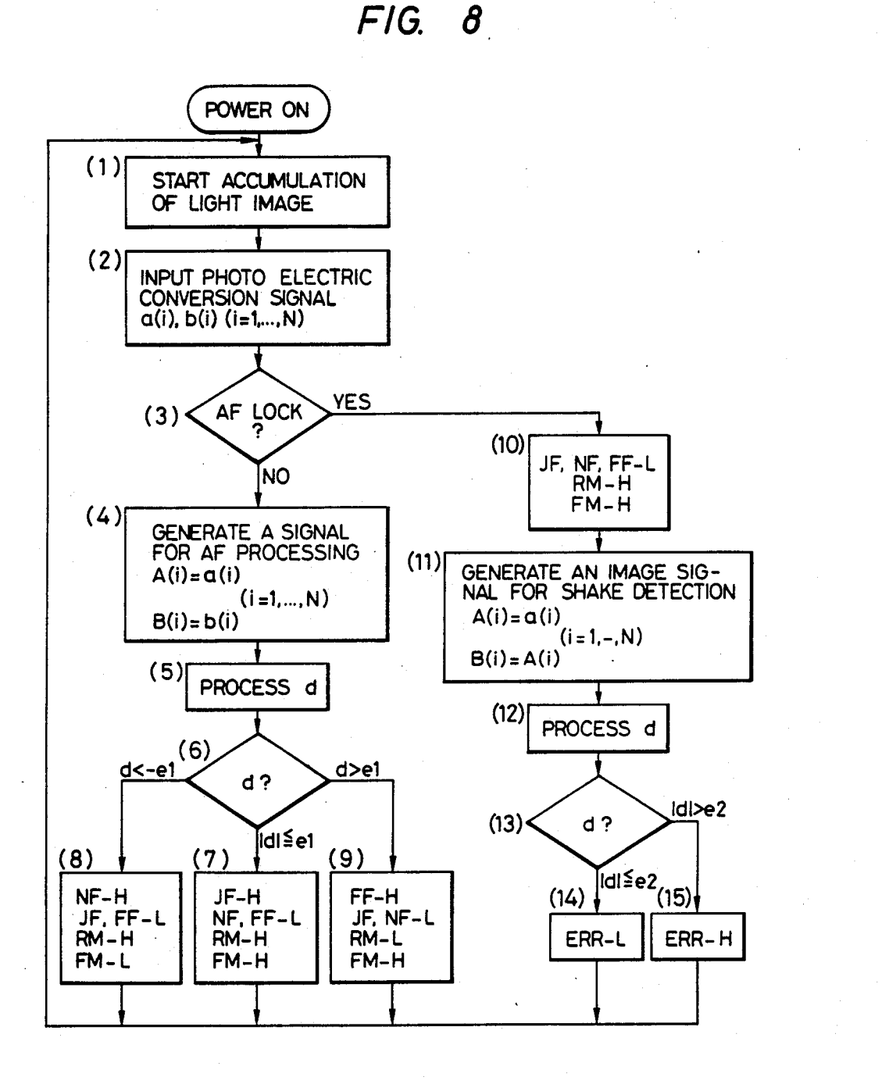
FIG. 8 is a flow chart of the electrical circuit shown in FIG. 7.

The mode of operation of the circuit configuration described above will be explained with reference to the flow chart shown in FIG. 8. The processor 11 has a program of the flow chart algorithm shown in FIG. 8. Parentheses ( ) indicate steps of the sequence.

(1) The processor 11 generates a start signal ST, the CCD driver 15 supplies a signal ICG to the sensor device 12, and accumulation of light images is started.

(2) When the driver 15 receives an accumulation end signal EOI from the sensor device 12 after the photocharges reach a predetermined accumulation level, it drives the A/D converter 13. The A/D converter 13 converts photoelectric conversion signals OS of the light images formed on the sensor arrays 12a and 12b and supplies digital signals a(i) and b(i) (where i=1, 2, . . . , N) of the two images A and B. These signals are sequentially stored in the memory.

(3) The processor 11 checks the AF lock switch 22.

(4) If the AF lock switch 22 is OFF, in order to perform automatic focus, image signals A(i), B(i) (where i=1,2, . . . , N) for automatic focus are generated in accordance with the procedures (I) above.

(5) The phase difference d is calculated in accordance with the procedures (II) and (III).

(6) The phase difference d is compared with the focus allowable value e1.

(7) If $|d| \leq e1$, it is determined that an in-focus state is obtained The terminal JF is set H to turn on the LED 17 connected thereto. At the same time, the terminals RM and FM are set H to brake the motor 14.

(8) If $d < -e1$, it is determined that the lens is in a near-in-focus state. The terminal NF is set H, the terminal RM is set H, and the terminal FM is set L so as to drive the motor 14.

(9) If $d > e1$, it is determined that the lens is in a far-in-focus state. The terminal FF is set H, the terminal RM is set L, and the terminal FM is set H. The motor 14 is driven in the direction opposite to that in the case of step (8).

(10) When the AF lock switch 22 is ON, the terminals JF and NF for locking the automatic focus are set L so as to turn off the LEDs 17 and the terminals RM and FM are set H to brake the motor 14.

(11) The shake detection image signals A(i) and B(i) (i=1, 2, . . . , N) are generated in accordance with the procedures (I') for shake detection.

(12) The phase difference d is calculated in accordance with the procedures (II) and (III) as in step (5).

(13) The phase difference d is compared with the handshaking allowable value e2.

(14) If $|d| \leq e2$, it is determined that no shake has occurred. The terminal ERR is set L to turn off the LED 21.

(15) If $|d| > e2$, it is determined that shake has occurred. The terminal ERR is set H to turn on the LED 21 to warn the operator of this condition.

In this manner, in this embodiment, it is difficult to perform shake detection during automatic focus due to movement of an object. Therefore, shake detection is performed by turning on the AF lock switch 22 after automatic focusing. After this series of operations is performed, the flow returns to step (1) for sensor accumulation. At this time, the image signals A(i) and B(i) (i=1, 2, . . . , N) are held in the memory until the flow advances to step (4) or step (11).

In the above description, shake detection is performed after the AF lock switch is turned on. However, focus detection and shake detection can be alternately performed after an in-focus state is confirmed.

In this case, the following procedures are taken $$C(i) = A(i)$$

$$A(i) = a(i)$$

$$B(i) = b(i)$$

where i=1,2, . . . , N.

Before shake detection is performed, when an operation C(i)=A(i) is performed in procedures (I), a processing sequence beginning with sensor image accumulation is started. In this sequence, the A image signals A' of the immediately preceding sequence are stored as signals C in a separate memory area. When shake detection is performed, these signals are used as the B image signals to calculate the phase difference d between the two images A and B. Then, the phase difference of images of a single image which are shifted over time is detected. If shake has actually occurred, the phase difference d has a value corresponding to such shake even if a single image is involved.

When the phase difference d calculated in this manner is compared with the predetermined allowable value e2 (positive value) and found to be $|d| \leq e2$, it is determined that no shake has occurred. These procedures can be represented by:

$$B(i) = C(i) \qquad (I')$$

where i=1, 2, . . . , N.

Note that C(i) are A image signals which are stored in a separate memory region in the immediately preceding sequence in the procedures (I). The procedures (I), (II) and (III) are the same as those in focus control, and procedures (I') are added next to (I).

Figure 9:
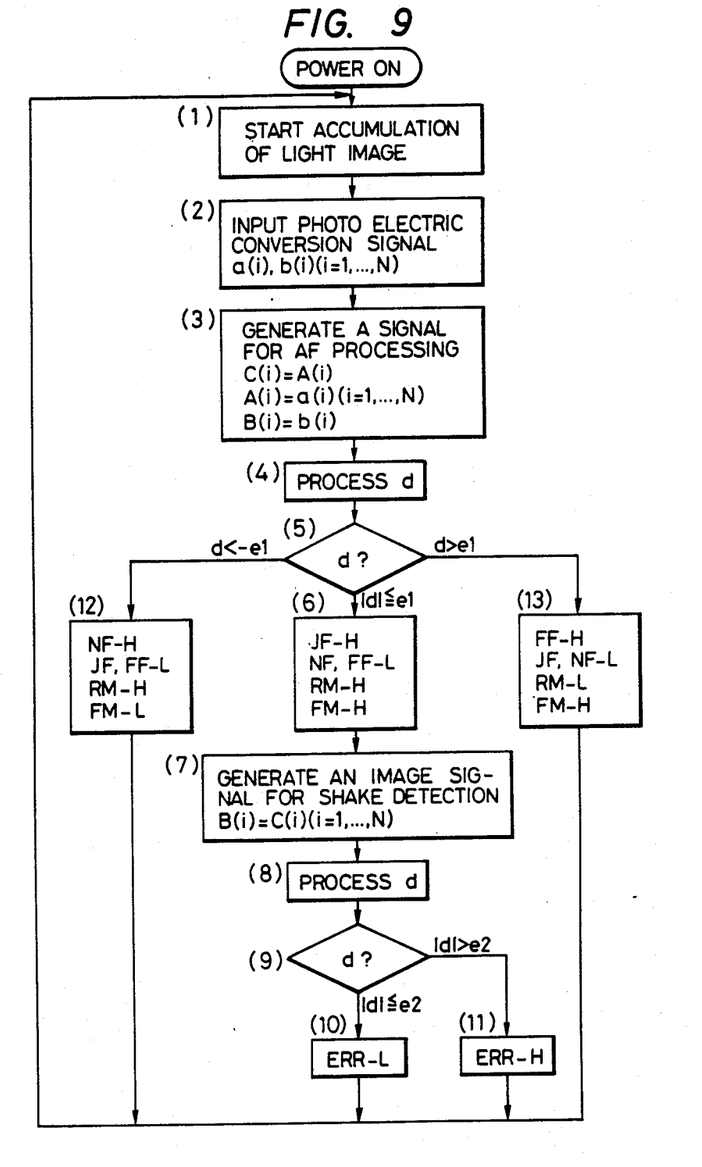
FIG. 9 is another example of the flow chart.

The mode of operation in this case will be described with reference to the flow chart shown in FIG. 9. The processor 11 prestores a program of an algorithm of the flow chart shown in FIG. 9. The algorithm steps indicated in parentheses.

(1) The processor 11 generates a start signal ST, and the CCD driver 15 supplies a signal ICG to the sensor device 12 causing it to start accumulating light images.

(2) When the photocharges reach a predetermined accumulation level, the sensor device 12 supplies an accumulation end signal EOI to the driver 15 to energize the A/D converter 13. The A/D converter 13 converts the photoelectric conversion signals OS of the light images formed on the sensor arrays 12a and 12b. The digital images a(i) and b(i) (i=1, 2, . . . , N) of the two images A and B are sequentially stored in the memory.

(3) In order to perform automatic focusing, the image signals A(i) and B(i) (i=1, 2, .... N) are generated in accordance with the procedures (I). In order to allow shake detection to be performed if an in-focus state is established, the signals A(i) of the immediately preceding sequence are stored in a separate memory area as signals C(i).

(4) The phase difference d is calculated in accordance with the procedures (II) and (III).

(5) The phase difference d is compared with the focus allowable value e1.

(6) If $|d| \leq e1$, it is determined that an in-focus state is obtained. The terminal JF is set H to turn on the LED 17. At the same time, the terminals RM and FM are set H to brake the motor 14.

(7) In the in-focus state, the A image signals C(i) of the immediately preceding sequence stored in step (3) are generated as signals B(i).

(8) The phase difference d is calculated in accordance with the procedures (II) and (III) as in step (4).

(9) The phase difference d is compared with the allowable value e2.

(10) If $|d| \leq e2$, it is determined that no shake has occurred. The terminal ERR is set L to turn off the LED 21.

(11) If $|d| > e2$, it is determined that shake has occurred. The terminal ERR is set H to turn on the LED 21, thereby signalling the operator of this condition.

(12) If it is determined in step (5) that $d < -e1$, it is determined that the lens is in a near-infocus state. The terminal NF is set H, the terminal RM is set H and the terminal FM is set L so as to drive the motor 14.

(13) If $d > e1$, it is determined that the lens in a far-infocus state. The terminal FF is set H, the terminal RM is set L and the terminal FM is set H so as to drive the motor 14 in the direction opposite to that in step (12).

In this sequence, shake detection is performed only when the in-focus state is determined. After a series of operations is performed, the flow returns to the sensor accumulation processing in step (1). Thus, focus detection and shake detection are alternately performed.

In the above description, focus detection and shake detection are performed independently of each other. However, in the case of a detection system of the present invention for calculating an out-of-focus state from a phase difference of two images, focus detection and shake detection can be performed in parallel if signal processors are arranged in parallel with each other.

Figure 10:
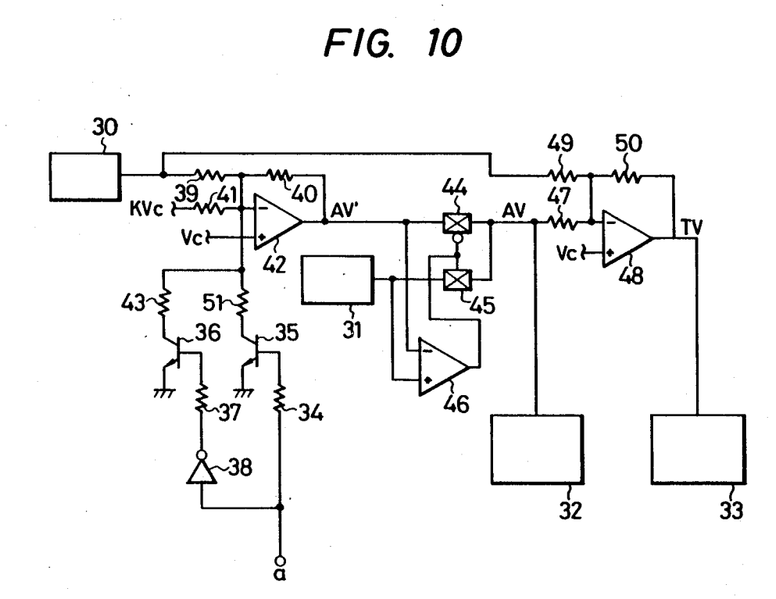
FIG. 10 is a block diagram of an exposure control system.
Figure 11:
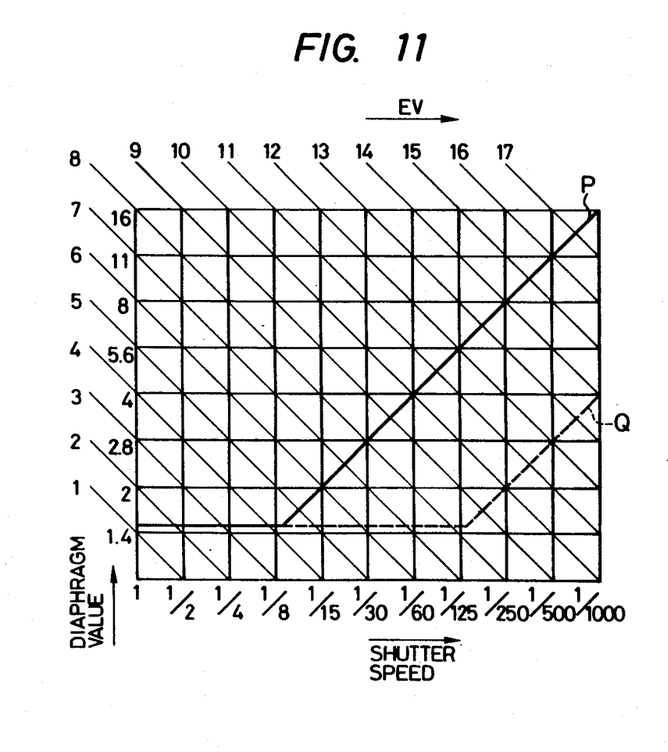
FIG. 11 is a program diagram for exposure control.

FIGS. 10 and 11 show the case wherein the degree of shake of a shake detection signal exceeds a predetermined value, and the program diagram of an automatic exposure system is shifted to a high speed shutter in order to prevent a blurred print. FIG. 10 shows an exposure control circuit which has a known program function described in, for example, Japanese Patent Disclosure No. 54-151445 (U.S. Pat. No. 4,358,188). A circuit 30 produces a voltage representing the negative value of EV which is determined by the brightness of an object and film speed. The circuit 30 consists of a photometer (not shown), a film speed setting section and the like. A circuit 31 provides a full-aperture diaphragm value AV0. Devices 32 and 33 control the diaphragm value and the shutter speed in accordance with values of AV and TV, respectively.

A description will first be made with reference to the case of program operation when no shake is detected. In this case, the output at an output end and a of the terminal ERR of the processor 11 is L. Therefore, a transistor 35 connected to the end a through a resistor 34 is OFF. Meanwhile, a transistor 36 connected to the end a through a resistor 37 and an inverter 38 is ON. When resistors 39, 40, and 41, an operational amplifier 42, constant voltages KVc and Vc, and a resistor 43 connected to the collector of the transistor 36 which in ON are properly set, an operation result of $AV' = (\frac{1}{2})EV - 1$ is produced at the output end of the operational amplifier 42. The output from the operational amplifier 42 is supplied to one terminal of an analog switch 44. A terminal of an analog switch 45 paired with this switch 44 receives the full-aperture diaphragm value AV0 from the circuit 31. Two input terminals of a comparator 46 receive an output AV' from the operational amplifier 42 and the value Av0 from the circuit 31. When $AV' \geq AV0$, an output L is produced. When $Av' < AV0$, an output H is produced. The output terminal of the comparator 46 is connected to a control terminal of the pair of the analog switches 44 and 45. When the output from the comparator 46 is L, the switch 44 is ON and the switch 45 is OFF. When the output from the comparator 46 is H, the switch 44 is OFF and the switch 45 is ON. The output terminals of the switches 44 and 45 are commonly connected, and the node produces a larger value of the value AV' and AV0 as AV. When the result AV' is smaller than AV0, the operation is performed such that AV=AV0. The diaphragm value control device 32 properly controls the diaphragm value in accordance with this value AV.

The value AV is connected to the inverting input terminal of an operational amplifier 48 through a resistor 47. $TV = EV - AV$ is produced at the output terminal of the operational amplifier 48 by properly setting the operational amplifier 48, resistors 47, 49, and 50, a signal $-EV$ and a constant voltage Vc. The shutter speed control device 33 controls the rear curtain drive of the shutter in accordance with the value TV.

The above series of operations represents the operation of the program diagram of P, indicated by the solid line in FIG. 11.

When shake is detected, the above-mentioned shake detection means sets the terminal a connected to the terminal ERR of the processor 11 at H level. Then, unlike in the case when no shake is detected, the transistor 35 is ON and the transistor 36 is OFF. A resistor 51 connected to the collector of the transistor 35 is rendered conductive. The operation result of $AV' = (\frac{1}{2})EV - 3$ is produced by the resistance of the resistor 51, and the subsequent operation is the same. However, in this case, the operation of the program diagram as indicated by Q and, shown by the broken line in FIG. 11, is performed.

In this manner, when shake is detected, the program diagram is shifted from P to Q. Then, with the same EV value, a higher shutter speed is selected, so that the adverse influence of handshaking is eliminated.

What is claimed is:

1. A focus detection apparatus including an image forming objective optical system, for forming images whose relative positional relationship is changed in response to focusing the objective optical system, wherein said apparatus comprises:

first image detecting means for detecting an image of an object;

second image detecting means for detecting the image of the object;

signal processing means for processing signals from said first and second image detecting means in accordance with a predetermined algorithm and for producing a focus control signal for focusing said apparatus on the object;

storage means for storing the signal from said first image detecting means;

discriminating means for discriminating the shaking of the image in accordance with the signal stored in said storage means and a new output signal from said first image detecting means; and control means for controlling said discriminating means to start to discriminate the shaking of the image after said signal processing means produces said focus control signal.

2. An apparatus according to claim 1, wherein said control means starts the operation of said discriminating means after said control means has confirmed that an auto-focusing lock switch is turned on.

3. An apparatus according to claim 1, wherein said discriminating means performs discrimination using said signal processing means.

4. An apparatus according to claim 1, further comprising a shutter, and control means for controlling the speed of said shutter and for shifting said shutter from a lower to a higher shutter speed in accordance with an output from said discriminating means.

5. An apparatus for detecting the movement of an image of an object, comprising:

optical means for forming a plurality of light distributions relating to the object from light beams passing through an objective lens, the relative positional relationship between said plurality of light distributions being varied as a function of the degree of focus of the objective lens;

sensing means having a plurality of sensors which respectively sense said plurality of light distributions;

signal processing means for processing a plurality of signals which are outputted from said sensing means and which respectively relate to said plurality of light distributions, wherein said signal processing means processes said plurality of signals according to a predetermined algorithm, and outputs a signal relating to the degree of focus of the objective lens;

discriminating means for discriminating the movement of the image of the object on the basis of signals spaced apart in time and outputted from said sensing means which relate to at least one of said light distributions; and control means for controlling said discriminating means to start discriminating movement of the image after said signal processing means produces said output signal.

6. An apparatus according to claim 5, further comprising warning means for issuing a warning when said discriminating means discriminates movement of the object.

7. An apparatus according to claim 6, wherein said warning means produces light when said discriminating means discriminates movement of the image, wherein said apparatus further comprises a finder for observing the image of the object formed by the objective lens, the light emitted by said warning means being introduced to said finder.

8. An apparatus according to claim 5, further comprising a diaphragm, a shutter, and control means for controlling shutter speed and diaphragm value and for shifting said shutter from a lower to a high shutter speed in accordance with an output from said discriminating means.

9. An apparatus according to claim 5, wherein said discriminating means discriminates the movement of the image of the object by processing the signals spaced apart in time according to said predetermined algorithm.

10. An apparatus according to claim 9, further comprising warning means for issuing a warning when said discriminating means discriminates movement of the object.

11. An apparatus according to claim 9, further comprising control means for controlling the shutter speed of a shutter and the diaphragm value of a diaphragm and for shifting the shutter from a lower to a high shutter speed in accordance with an output from said discriminating means.

12. An apparatus according to claim 5, wherein said control means starts the operation of said discriminating means after said control means has confirmed that an auto-focusing lock switch is turned on.

13. An apparatus for detecting the movement of an image of an object, comprising:

optical means for forming a plurality of light distributions relating to the object from light beams passing through an objective lens, the relative positional relationship between said plurality of light distributions being varied as a function of the degree of focus of the objective lens;

sensing means having a plurality of sensors which respectively sense said plurality of light distributions;

signal processing means for processing a plurality of signals which are outputted from said sensing means and which respectively relate to said plurality of light distributions, wherein said signal processing means processes said plurality of signals according to a predetermined algorithm and outputs a signal relating to the degree of focus of the objective lens;

discriminating means for discriminating the movement of the image of the object on the basis of signals spaced apart in time and outputted from said sensing means which relate to at least one of said plurality of light distributions; and control means for controlling the shutter speed of a shutter and the diaphragm value of a diaphragm and for shifting the shutter from a lower to a higher shutter speed in accordance with an output from said discriminating means.

14. An apparatus according to claim 13, wherein said discriminating means discriminates the movement of the image of the object by processing the signals spaced apart in time according to said predetermined algorithm.

* * * * *

UNITED STATES PATENT AND TRADEMARK OFFICE
CERTIFICATE OF CORRECTION

PATENT NO. : 4,709,138  Page 1 of 2
DATED : November 24, 1987
INVENTOR(S) : YASUO SUDA, ET AL.

It is certified that error appears in the above-identified patent and that said Letters Patent is hereby corrected as shown below:

COLUMN 2

Line 7, "signal" should read --signals--.
Line 32, "FIG. 1," should read --FIG. 1A,--.
Line 33, "positons" should read --positions--.
Line 37, "FIGS. 2 and 3," should read --FIGS. 2A and 3A,--.
Line 48, "imgae" should read --image--.
Line 63, "whick" should read --which--.

COLUMN 4

Line 2, "Bb(1), b(2),..., b(n)}" should read
    --B{b(1), b(2),..., b(n)}--.
Line 30, "NF If" should read --NF. If--.

COLUMN 5

Line 36, "procedures" should read --procedure--.
Line 42, "obtained The" should read --obtained. The--.

COLUMN 6

Line 17, "taken" should read --taken:--.
Line 19, "C(i)=A(i)" should read --(I)    C(i)=A(i) --.
Line 45, "B(i)=C(i)     (I')" should read
    --(I')    B(i)=C(i)--.
Line 56, "steps indi-" should read --steps are indi---.

COLUMN 7

Line 32, "near-infocus" should read --near-in-focus--.

UNITED STATES PATENT AND TRADEMARK OFFICE
CERTIFICATE OF CORRECTION

PATENT NO. : 4,709,138  Page 2 of 2
DATED : November 24, 1987
INVENTOR(S) : YASUO SUDA, ET AL.

It is certified that error appears in the above-identified patent and that said Letters Patent is hereby corrected as shown below:

COLUMN 8

```
Line 1,  "and" should be deleted.
Line 17, "Av0" should read --AV0--.
Line 18, "Av'<AV0," should read --AV'<AV0,--.
Line 53, "and," should read --and--.
```

Signed and Sealed this

Thirty-first Day of January, 1989

Attest:

DONALD J. QUIGG

Attesting Officer

Commissioner of Patents and Trademarks